United States Patent
Barger

(10) Patent No.: US 10,048,090 B2
(45) Date of Patent: Aug. 14, 2018

(54) DIRECT POSITION MEASUREMENT FOR AIRCRAFT FLIGHT CONTROL SURFACES

(71) Applicant: HAMILTON SUNDSTRAND CORPORATION, Windsor Locks, CT (US)

(72) Inventor: Victor Barger, Lake in the Hills, IL (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 363 days.

(21) Appl. No.: 14/300,853

(22) Filed: Jun. 10, 2014

(65) Prior Publication Data

US 2016/0200450 A1 Jul. 14, 2016

(51) Int. Cl.
*B64D 45/00* (2006.01)
*G01D 5/14* (2006.01)
*B64C 27/00* (2006.01)

(52) U.S. Cl.
CPC ......... *G01D 5/145* (2013.01); *B64D 45/0005* (2013.01); *B64C 27/008* (2013.01)

(58) Field of Classification Search
CPC .... B64D 45/0005; G01D 5/145; B64C 13/00; B64C 9/00; B65C 5/10
See application file for complete search history.

(56) References Cited

U.S. PATENT DOCUMENTS

| | | | |
|---|---|---|---|
| 6,295,006 B1 * | 9/2001 | Kohlhepp | B64C 27/001 244/17.11 |
| 6,411,082 B2 * | 6/2002 | Glasson | G01D 5/04 324/207.2 |
| 6,894,487 B2 * | 5/2005 | Kunz-Vizenetz | G01D 5/145 324/207.23 |
| 8,395,382 B2 * | 3/2013 | Phan Le | B82Y 25/00 324/244 |
| 2002/0022926 A1 * | 2/2002 | Suzuki | G01C 21/26 701/525 |
| 2011/0002944 A1 | 1/2011 | Ming et al. | |
| 2014/0061369 A1 * | 3/2014 | Schank | B64C 27/008 244/17.13 |

FOREIGN PATENT DOCUMENTS

EP 2392510 A1 * 12/2011 ......... B64D 45/0005

OTHER PUBLICATIONS

Extended Search Report; Application No. EP 15170776; dated Jul. 30, 2015; pp. 1-5.

* cited by examiner

*Primary Examiner* — Julian Huffman
*Assistant Examiner* — Michael Konczal
(74) *Attorney, Agent, or Firm* — Cantor Colburn LLP

(57) ABSTRACT

A method and apparatus for determining a discrete position of a first surface of an aircraft is disclosed. The first surface and a second surface movable relative to the first surface are provided. A sensor is disposed on one of the first surface and a second surface and a magnetic field source disposed on the other of the first surface and the second surface. The sensor detects a local magnetic field related to the magnetic field source and generates a voltage indicative of strength of the local magnetic field. The strength of the local magnetic field and therefore the generated voltage is related to a relative position between the sensor and the magnetic field source. The relative distance between the first surface and the second surface is determined from the generated voltage.

13 Claims, 5 Drawing Sheets

DIRECT POSITION MEASUREMENT FOR AIRCRAFT FLIGHT CONTROL SURFACES

BACKGROUND

The present disclosure relates to flight control systems and, in particular, to a method and apparatus for determining a position of a flight control surface of an aircraft.

An Aircraft utilizes a number of surfaces such as slats, flaps and horizontal stabilizers which are extended, retracted and rotated for aerodynamic control of the aircraft. Flight control systems integrate sensors for control surface position feedback. The position feedback sensors are typically electrically redundant linear variable differential transformers (LVDTs), resolvers or rotary variable differential transformers (RVDTs). Such flight control position feedback sensors tend to be bulky, providing additionally weight to the aircraft and requiring wings, etc. to be designed to accommodate these transformers and ancillary parts.

SUMMARY

According to one embodiment of the present disclosure, a method of determining a position of a first surface of an aircraft includes: disposing a sensor on one of the first surface and a second surface, wherein the first surface is moveable relative to the second surface; disposing a magnetic field source on the other of the first surface and the second surface to provide a discrete position of the first surface; detecting a local magnetic field at the sensor indicative of the relative position of the magnetic field source to the sensor; generating a voltage at the sensor indicative of the detected local magnetic field; and determining the discrete position of the first surface relative to the second surface from the generated electrical voltage.

According to another embodiment of the present disclosure, an apparatus for controlling an aircraft includes: a first surface; a second surface movable relative to the first surface; a magnetic field source disposed on one of the first surface and the second surface; a sensor disposed on the other of the first surface and the second surface, the sensor configured to generate a voltage indicative of a magnetic field related to a distance between the sensor and the magnetic field source; and a processor configured to determine a relative distance between the first surface and the second surface from the generated voltage to control the aircraft.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

The subject matter which is regarded as the disclosure is particularly pointed out and distinctly claimed in the claims at the conclusion of the specification. The forgoing and other features, and advantages of the disclosure are apparent from the following detailed description taken in conjunction with the accompanying drawings in which:

DETAILED DESCRIPTION

Figure 1:
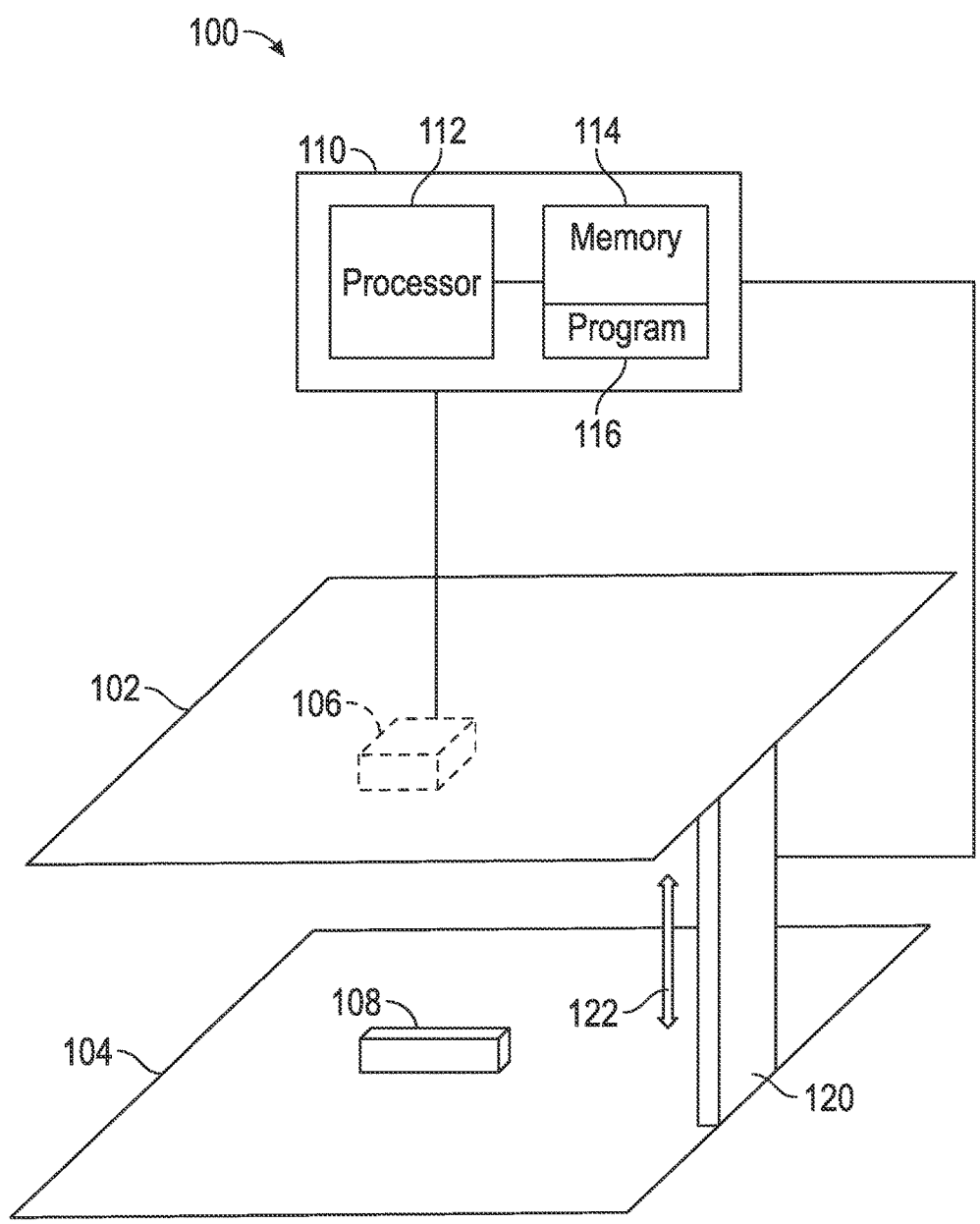
FIG. 1 shows an illustrative flight surface control system suitable for use in an aircraft in one embodiment of the present disclosure.

FIG. 1 shows an illustrative flight surface control system 100 suitable for use in an aircraft in one embodiment of the present disclosure. The flight surface control system 100 includes a first surface 102 and a second surface 104. The first surface 102 and the second surface 104 are moveable relative to each other by an actuator 120 (or actuator assembly) as indicated by arrow 122. In one embodiment, the first surface 102 may include a flight control surface of the aircraft and the second surface 104 may be a stationary surface of the aircraft that supports the first surface 102 at the aircraft. The flight control surface may include, for example, a horizontal stabilizer control surface, an aileron control surface, a rudder control surface, a trim tab control surface or any other surface that is used in the control of a flight of the aircraft.

The first surface 102 includes a sensor 106 disposed thereon that is sensitive to a magnetic field. In various embodiments, the sensor 106 may include a single ratiometric Hall effect sensor, multiple ratiometric Hall effect sensors, as well as an amplifier and/or a filter. The second surface 104 includes a magnetic field source 108 disposed thereon which could have a single or multiple magnetic poles facing the sensor. The sensor 106 and the magnetic field source 108 may be disposed facing each other so as to be in a direct line of sight of each other. This is shown in FIG. 1 by the sensor 106 disposed on a lower face of the first surface 102 (indicated by dashed lines) and the magnetic field source 108 disposed on an upper face of the second surface 104 Magnetic shielding may be used to isolate the sensor 106 from magnetic field lines besides those provided by the magnetic field source 108. In various embodiments, the magnetic field source 108 may include a single magnet, a plurality of magnets, an electromagnet or electromagnetic assembly and/or a magnetic source capable of producing a shaped magnetic field. In alternate embodiments, the first surface 102 includes the magnetic field source 108 disposed thereon while the second surface 104 includes the sensor 106 disposed thereon. In either of these embodiments, motion of the first surface 102 relative to the second surface 104 produces a motion of the magnetic field source 108 relative to the sensor 106.

Figure 2A:
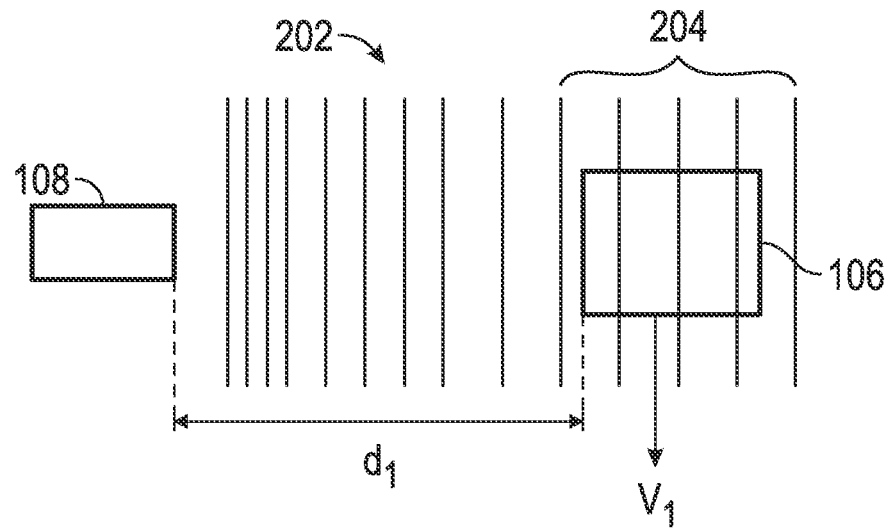
FIGS. 2a and 2b illustrate operation of the sensor in determining a magnitude of the magnetic field source with respect to the sensor and thus a relative position of the first surface and second surface.
Figure 2B:
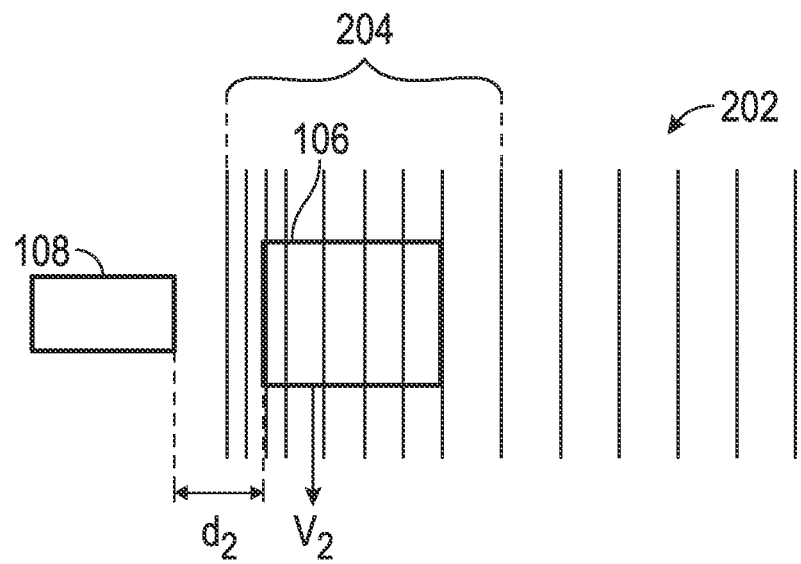

FIGS. 2a and 2b illustrate operation of the sensor 106 in determining a magnitude of the magnetic field source 108 with respect to the sensor 106 and thus a relative position of first surface 102 to the second surface 104. The magnetic field source 108 produces magnetic field lines 202. The flux density of the magnetic field lines 202 varies along magnetic field source 108. Magnetic field strength is illustrated by relative densities of magnetic field lines 202 in FIGS. 2a and 2b. The sensor 106 generates a voltage that is proportional to a strength of a local magnetic field 204 (i.e., a magnetic field at the sensor 106). Therefore, when the magnetic field source 108 at a first position ($d_1$; FIG. 2a) with respect to the sensor 106 and the local magnetic field 204 has a first magnetic field strength, sensor 106 generates a voltage at a first value ($V_1$) corresponding to the first magnetic field strength of the local magnetic field 204. When the magnetic field source 108 and the sensor 106 are positioned to a second location ($d_2$; FIG. 2b) and the local magnetic field 204 has a second magnetic field strength, the sensor 106 generates a voltage at a second value ($V_2$) corresponding to the second magnetic field strength of the local magnetic field 204. Thus, voltage values $V_1$ and $V_2$ are different and may be used to determine the distance between the magnetic field source 108 and the sensor 106 and hence between the first surface 102 and the second surface 104. Prior to being deployed, the sensor 106 may be calibrated to various sensor-source positions and magnetic field strengths. Thus, a selected voltage of the sensor 106 may correspond to a selected position between the first surface 102 and the second surface 104.

Referring again to FIG. 1, the voltage (e.g., $V_1$, $V_2$) generated by the sensor 106 is transmitted to a control unit 110. The control unit 110 includes a processor 112 and a memory 114 that may include any suitable non-transitory computer-readable medium such as a solid-state memory device, etc. The memory 114 may include programs 116 stored therein that enable the processor 112 to perform various instructions for determining a position between the first surface 102 and the second surface 104 and for controlling a position between the first surface 102 and the second surface 104.

In one embodiment, the processor 112 calculates the position of the first surface 102 relative to the second surface 104 from the voltage generated by sensor 106. In another embodiment, the processor 112 may control a position between the first surface 102 and the second surface 104. As an example, the processor 112 may select a relative position between the first surface 102 and the second surface 104 and determine an expected voltage that is generated by the sensor 106 when the first surface 102 and the second surface 104 are at the selected relative positions. The processor 112 may then send a signal to the actuator 120 to move the first surface 102 with respect to the second surface 104 and monitor the voltage generated by the sensor 106 while moving the first surface 102 with respect to the second surface 104. By comparing the voltage generated by the sensor 106 with the expected voltage, the processor 112 may determine a suitable action for the actuator 120. For example, the actuator 120 may be controlled to continue motion when the first surface 102 and second surface 104 are approaching the selected relative position, reverse motion when the first surface 102 and second surface 104 are diverging from the selected relative distance or to cease motion when the generated voltage from the sensor 106 is within a selected criterion of the expected voltage (indicating that the first surface 102 and the second surface 104 are substantially at the selected relative distance).

Figure 3:
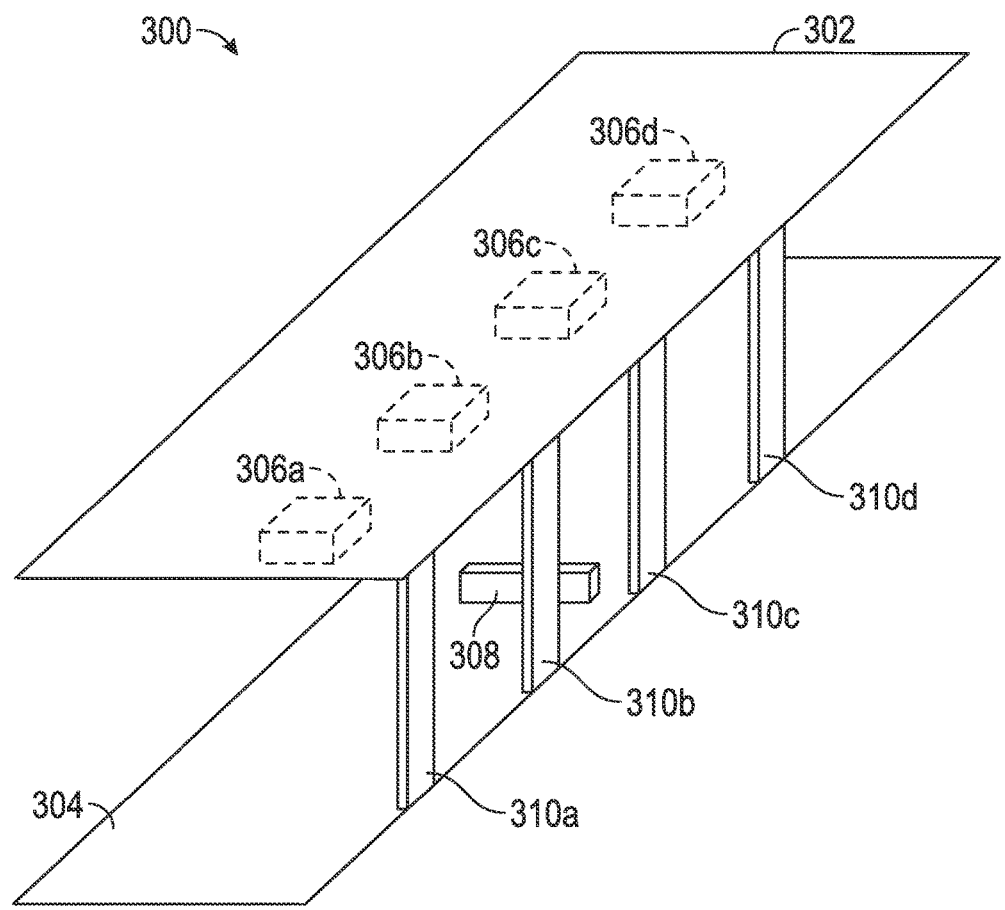
FIG. 3 shows an alternate embodiment of a flight surface control system in which a skew relation of the flight control surface may be determined and controlled.

FIG. 3 shows an alternate embodiment of a flight surface control system in which a skew relation of the flight control surface may be determined and controlled. The flight surface control system 300 includes a first surface 302 including a plurality of sensors 306a, 306b, 306c and 306d disposed thereon. The apparatus 300 further includes a second surface 304 including at least one magnetic field source 308 disposed thereon. The plurality of sensors 306a-d generates voltages based on their relative position with respect to the at least one magnetic field source 308. The generated voltages may be used to determine a rotation or bending of the first surface 302 or other skew relation between the first surface 302 and the second surface 304. A plurality of actuators 310a, 310b, 310c and 310d are configured to move sections of the first surface 302 towards or away from corresponding sections of the second surface 304. A processor (not shown in FIG. 3) may receive the voltage signals from a selected sensors (e.g., sensor 306a) and determine a suitable action for a related actuator (e.g., actuator 310a) in order to correct for rotation of the first surface 302 or for a skew relation between the first surface 302 and the second surface 304, etc. Although a single magnetic field source 308 is shown in FIG. 3, a plurality of magnetic field sources may be used in alternate embodiments. In particular, each of the plurality of magnetic field sources may be disposed on the second surface 304 so that each magnetic field source corresponds directly with a respective sensor. Each sensor may thus respond to the magnetic field of its corresponding magnetic field source. Magnetic field shielding may be used to prevent a magnetic field from one of the plurality of magnetic field sources from being detected at a non-corresponding sensor. In an alternate embodiment, the at least one magnetic field source 308 may be disposed on the first surface 302 while the sensors 306a-d are disposed on the second surface 304.

Figure 4:
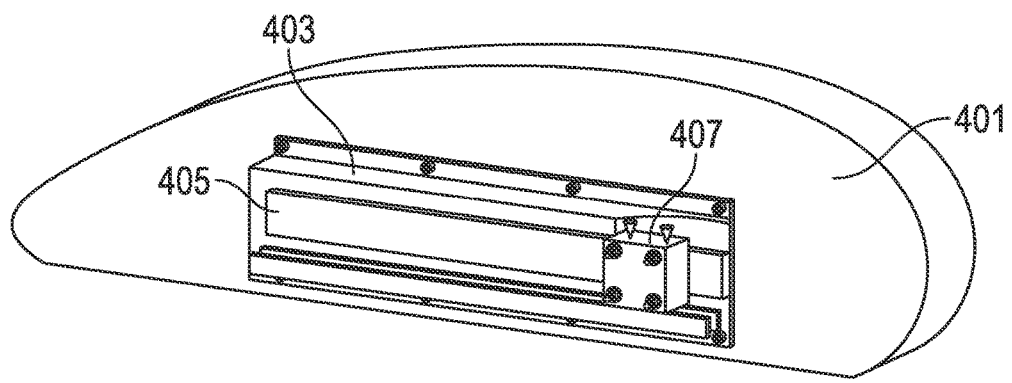
FIG. 4 shows an illustrative aerodynamic surface of an aircraft that includes a position sensor of the present disclosure.

FIG. 4 shows an illustrative aerodynamic surface 401 of an aircraft that includes a position sensor of the present disclosure. The aerodynamic surface 401 includes a guide track 403 that is attached or coupled to the aerodynamic surface 401. The guide track 403 may include a magnetic field source 405 disposed along its length. A sensor housing 407 is slidable along the guide track 403. The sensor housing 407 may include the sensor as well as various circuitry, such as a signal filter for filtering a signal from the sensor and an amplifier for amplifying a signal from the sensor.

Figure 5:
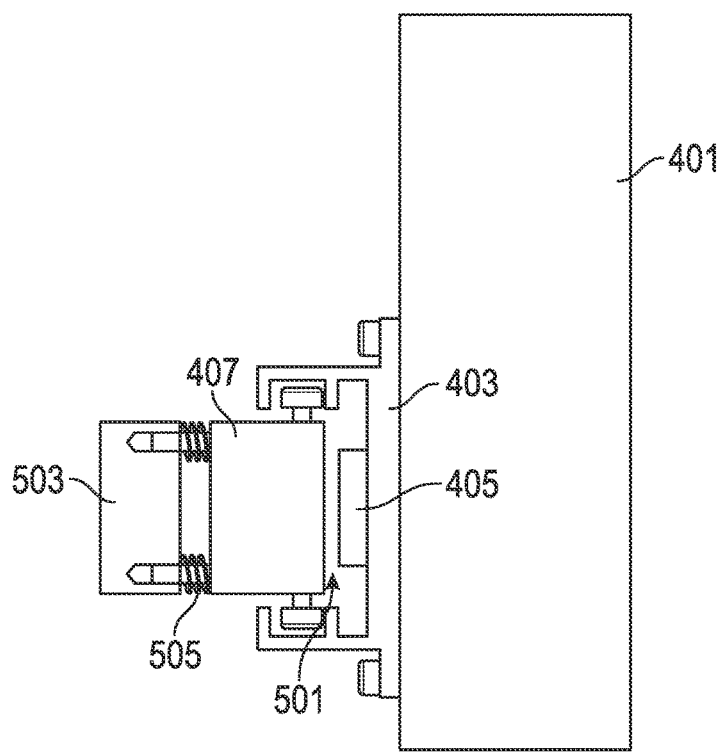
FIG. 5 shows a side view of the illustrative aerodynamic surface of FIG. 4.

FIG. 5 shows a side view of the illustrative aerodynamic surface 401. The sensor housing 407 is seen to be separated from the magnetic field source 405 by an air gap 501. The sensor housing further includes static support structure 503, such as an aircraft fuselage, etc., separated from the sensor housing by springs 505. The springs 505 may be used to control a width of the air gap 501 or separation between support structure 503 and aerodynamic surface 401. The sensor housing 407 may contain a single ratiometric Hall effect sensor or multiple Hall effect sensors. The use of multiple Hall effect sensors may be for the purpose of system redundancy. A motion of the aerodynamic surface 401 motion may be linear, angular or may have a complex kinematic motion defined by a multiple order polynomial. Therefore, the guide track 403 and the magnetic field source 405 may be linear, angular or defined by a multiple order polynomial. In one embodiment, the magnetic field source 405 may have a single magnetic pole along its length. In an alternate embodiment, the magnetic field source 405 may have multiple poles along its length. As shown below in FIGS. 6 and 7, the magnetic flux of the magnetic field source 405 may be used to produce a signal related to a position of the sensor housing with respect to the aerodynamic surface 401. Thus, the signal may be give a relative position of the aerodynamic surface 401 with respect to the support structure 503. In various embodiments, the signal gives a feedback of a discrete measurement of the relative position of the aerodynamic surface 401 and the support structure 503.

Figure 6:
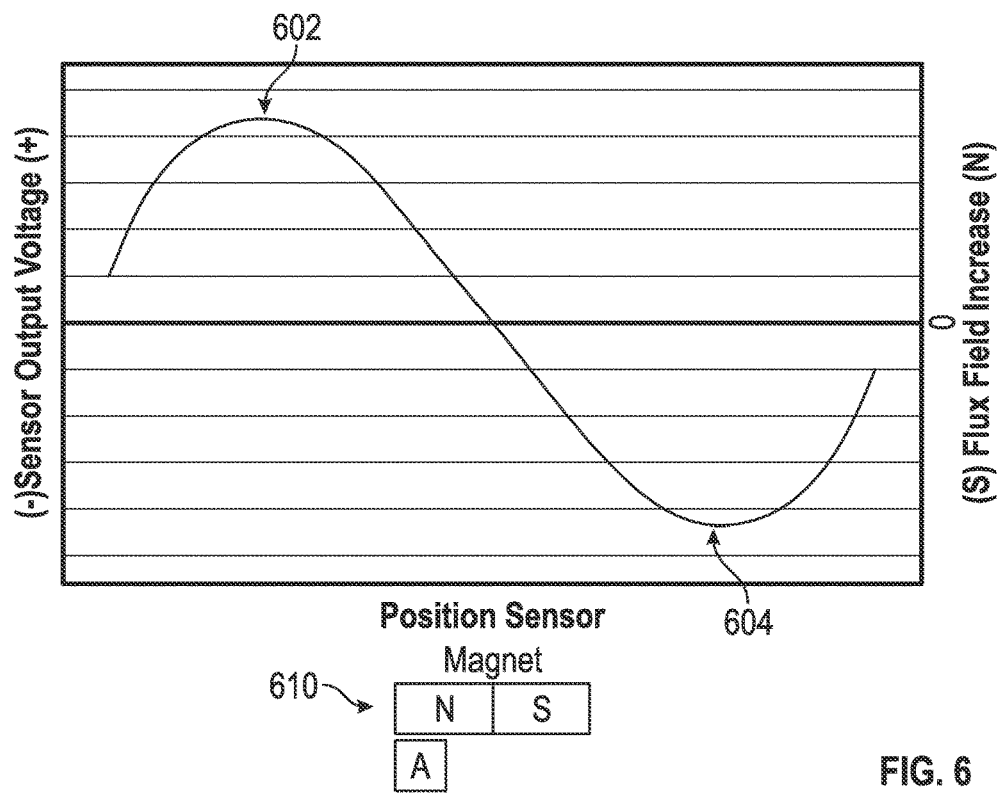
FIG. 6 shows a sensor output that corresponds with the sensor housing moving along a guide track that includes multiple poles along its length, as shown in the configuration.

FIG. 6 shows a sensor output that corresponds with the sensor housing 407 moving along a guide track 403 that includes multiple poles along its length, as shown in the configuration 610. The sensor may pass from a region 602 of relatively high positive magnetic field density to a region 604 of relatively high negative magnetic field density. A voltage output from the sensor therefore corresponds to these magnetic field densities. The voltage output may be used to determine the position of the sensor housing 407 along the guide track 403.

Figure 7:
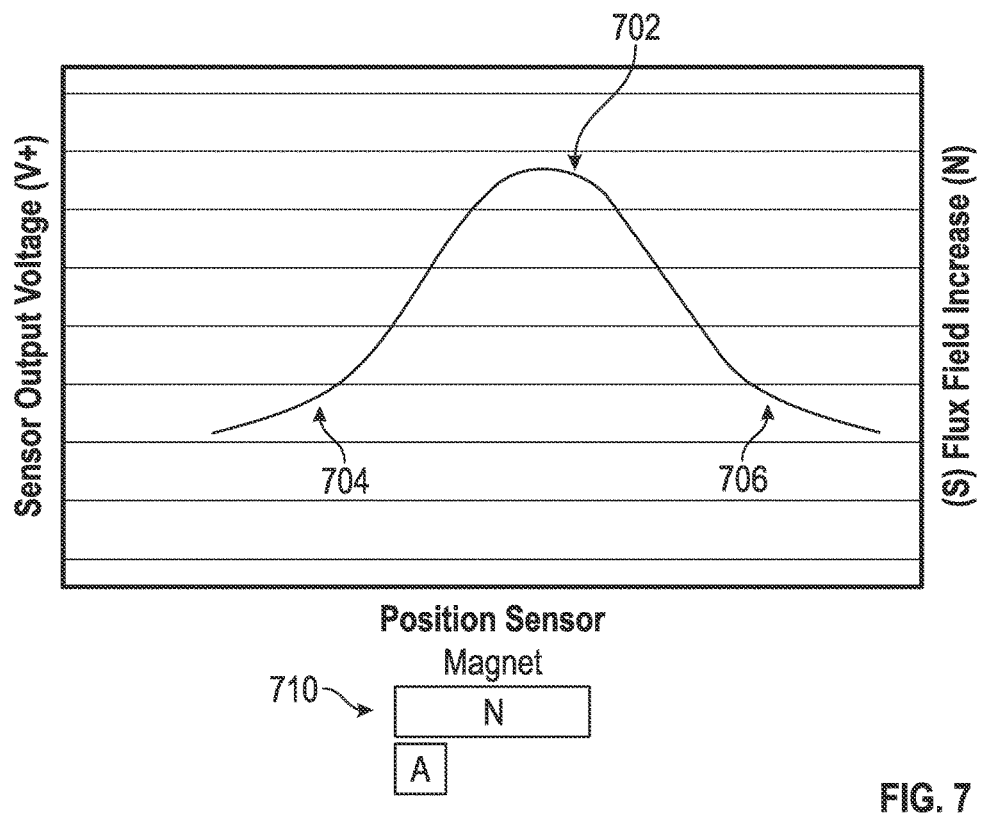
FIG. 7 shows a sensor output that corresponds with a sensor housing moving along a guide track that includes a single pole along its length, as shown in the configuration.

FIG. 7 shows a sensor output that corresponds with a sensor housing 407 moving along a guide track 403 that includes a single pole along its length, as shown in the configuration 710. A region 702 of relatively high magnetic field density is surrounded on both sides by regions 704 and 706 of relatively low magnetic field density. The voltage output from the sensor may thus be used to determine the position of the sensor housing 407 along the guide track 403.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof. For the purposes of this disclosure, it is further understood that the terms "inboard" and "outboard" can be used interchangeably, unless context dictates otherwise.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

While the exemplary embodiment to the disclosure has been described, it will be understood that those skilled in the art, both now and in the future, may make various improvements and enhancements which fall within the scope of the claims which follow. These claims should be construed to maintain the proper protection for the disclosure first described.

What is claimed is:

1. A method of determining a position of a first surface of an aircraft, comprising:
   disposing a sensor on one of the first surface and a second surface, wherein the first surface is moveable relative to the second surface;
   disposing a magnetic field source on the other of the first surface and the second surface to provide a discrete position of the first surface, wherein the magnetic field source comprises multiple magnets configured to produce an elongated magnetic field source having multiple magnetic poles along its length such that a lengthwise linear motion of the elongated magnetic field source produces a sinusoidal signal by passing from a region of relatively high positive magnetic field density to a region of relatively high negative magnetic field density;
   detecting a local magnetic field at the sensor indicative of the relative position of the magnetic field source to the sensor after a complex kinematic motion of the first surface defined by a multiple order polynomial;
   generating a voltage at the sensor indicative of the detected local magnetic field; and
   determining the discrete position of the first surface relative to the second surface from the generated electrical voltage.

2. The method of claim 1, wherein the sensor further comprises at least one of: (i) a ratiometric Hall-effect sensor; (ii) a sensor that generates a voltage corresponding to a strength of a local magnetic field; (iii) an amplifier of sensor output voltage; (iv) a filter of sensor output voltage; and (v) sensor housing with a spring loaded standoff for controlling an air gap between the sensor housing and the magnetic field source.

3. The method of claim 1, further comprising controlling a relative distance between the first surface and the second surface based on the generated voltage.

4. The method of claim 3, further comprising:
   determining an expected voltage of the sensor for a selected relative distance between the first surface and the second surface; and
   moving the first surface and the second surface to the selected relative distance based on a comparison of the generated voltage of the sensor to the expected voltage.

5. The method of claim 1, further comprising disposing a plurality of sensors on the one of the first surface and the second surface and determining a skew relation of the first surface with respect to the second surface from a plurality of electrical voltages generated by the plurality of sensors.

6. The method of claim 1, wherein the first surface is a movable flight control surface and the second surface is a stationary surface relative to the moveable flight control surface.

7. An apparatus for determining a position of a first surface of an aircraft, comprising:
   a second surface movable relative to the first surface, wherein the first surface is a flight control surface that is not movable;
   a magnetic field source disposed on one of the first surface and the second surface, wherein the magnetic field source comprises multiple magnets configured to produce a shaped magnetic field, the magnetic field source having multiple magnetic poles along its length;
   a sensor disposed on the other of the first surface and the second surface, the sensor configured to generate a voltage based on a local magnetic field indicative of a distance between the sensor and the magnetic field source after a complex kinematic motion of the first surface defined by a multiple order polynomial; and
   a processor configured to determine a relative distance between the first surface and the second surface from the generated voltage to control the aircraft.

8. The apparatus of claim 7, wherein the sensor further comprises at least one of: (i) a ratiometric Hall-effect sensor; (ii) a sensor that generates a voltage corresponding to a strength of a local magnetic field; (iii) an amplifier of sensor output voltage; (iv) a filter of sensor output voltage; and (v)

sensor housing with a spring loaded standoff for controlling an air gap between the sensor housing and the magnetic field source.

9. The apparatus of claim 7, wherein the processor is further configured to control a relative distance between the first surface and the second surface based on the generated voltage.

10. The apparatus of claim 9, wherein the processor is further configured to control the relative distance by:
   selecting a relative distance between the first surface and the second surface;
   determining an expected voltage of the sensor for the selected relative distance; and
   moving the first surface and the second surface to the selected relative distance based on a comparison of the generated voltage from the sensor and the expected voltage.

11. The apparatus of claim 7, wherein the sensor further comprises a plurality of sensors and the processor is further configured to determine a skew relation of the first surface and the second surface from a plurality of voltages generated by the plurality of sensors.

12. The apparatus of claim 7, wherein the first surface is a stationary surface and the second surface is a moveable flight control surface moveable relative to the first surface.

13. The apparatus of claim 12, wherein the flight control surface is one of: (i) a horizontal stabilizer control surface; (ii) an aileron control surface; (iii) a rudder control surface; (iv) a trim tab control surface; (v) a high lift flap; (vi) a slat control surface; and (vii) a surface used in the control of a flight of the aircraft.

* * * * *